May 28, 1929.  W. J. SPENCER  1,714,643
LOADING ATTACHMENT FOR HAY BALING MACHINES
Filed Oct. 10, 1927   2 Sheets-Sheet 1

INVENTOR
Walter J. Spencer.
BY
John M. Spellman
ATTORNEY

May 28, 1929.  W. J. SPENCER  1,714,643

LOADING ATTACHMENT FOR HAY BALING MACHINES

Filed Oct. 10, 1927    2 Sheets-Sheet 2

INVENTOR
Walter J. Spencer,
BY John M. Spellman
ATTORNEY

Patented May 28, 1929.

1,714,643

UNITED STATES PATENT OFFICE.

WALTER J. SPENCER, OF EMPORIA, KANSAS.

LOADING ATTACHMENT FOR HAY-BALING MACHINES.

Application filed October 10, 1927. Serial No. 225,073.

This invention relates to improvements in machines for baling hay and the like, more particularly having reference to an attachment for hay baling machines.

The principal object of the invention is to provide in the attachment a means for raising the hay or other product from the ground and placing it on a feeding platform the same height as the top of the hay baler chamber. Usually, the hay, fodder or the like is lifted up to the baler chamber by hand by means of pitch forks. The present arrangement enables the hay to be placed on the feeding platform in such a manner that the hay is loose and easy to pull apart for feeding into the baler. The arrangement embodied in the present invention also enables a supply of hay to be moved towards the baler chamber gradually, having means for adjustment providing for the movement of the hay toward the baler chamber as the hay is fed into the chamber.

The above and other objects of the invention will be fully understood from a perusal of the following detailed description taken in connection with the accompanying drawings and wherein.

Figure 1:
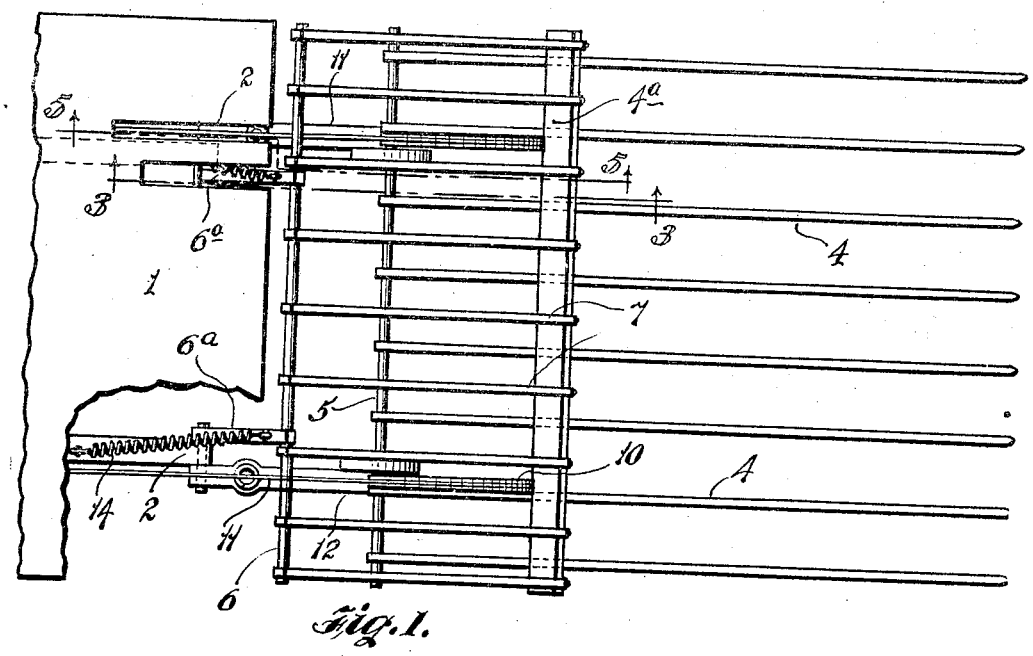
Figure 1 is a top or plan view of the attachment in its lowermost position.
Figure 2:
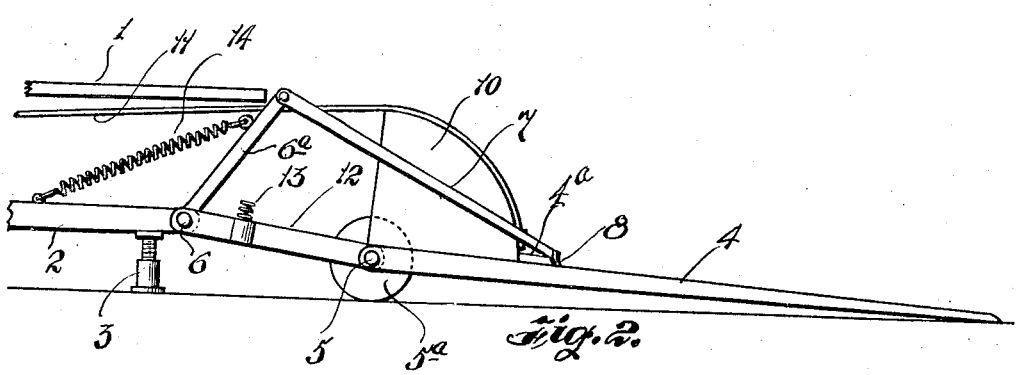
Figure 2 is a side elevational view of the attachment.

Proceeding in accordance with the drawings and wherein similar numerals indicate the several parts, 1 denotes the feeding platform of a hay bailing machine. Rigidly connected to and projecting from the frame of the baler are two beams 2. These beams are supported upon jacks 3 when the baler is installed for operation.

The invention provides for the hoisting or raising of the hay or the like by means of a framework comprising a plurality of spaced master fork members 4. These members are tapered toward their outer ends and their inner ends are rigidly connected to a rod 5. This rod is supported by wheels 5ª. To properly space and hold the master fork members 4 in proper relation there is provided a cross-piece 4ª. The framework also includes a second rod 6 to which are secured the inner ends of the link members 6ª. Pivoted to the outer ends of link members 6ª are a plurality of minor or shorter and outwardly tapered members 7 having hooks 8 projecting from their outer ends.

The purpose of these hooks is to prevent the ends of the minor fork members from slipping over the cross-piece 4ª when the master fork members are in lowered position.

Figure 3:
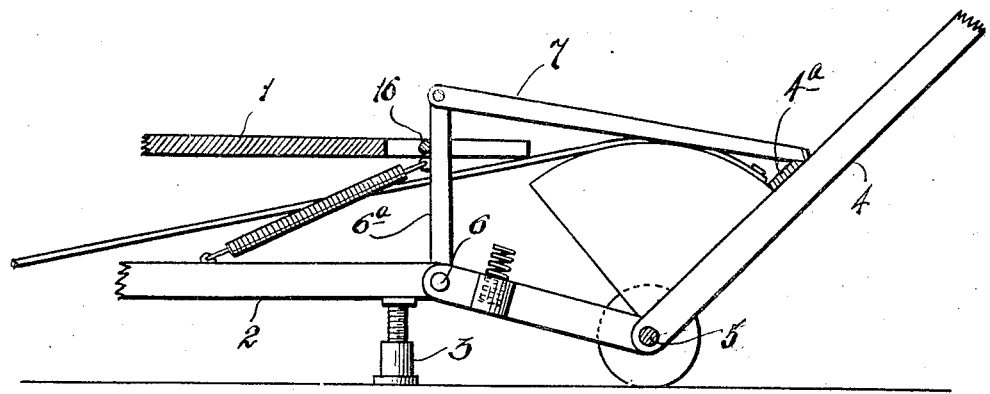
Figures 3, 4 and 5 represent views similar to Figure 2 and representing different positions of the attachment.
Figure 4:
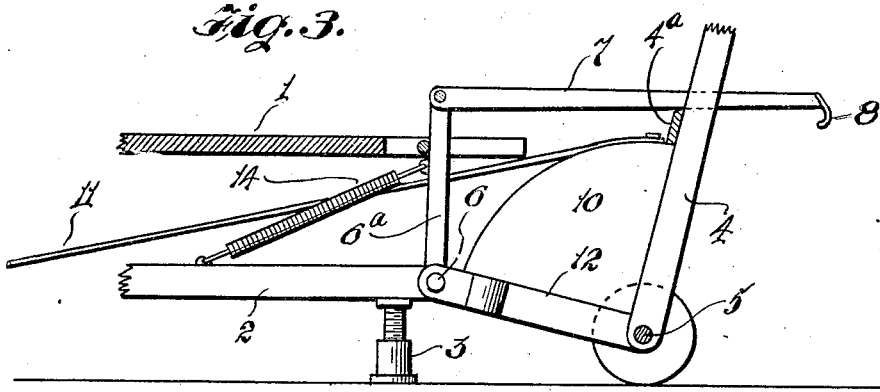
Figure 5:
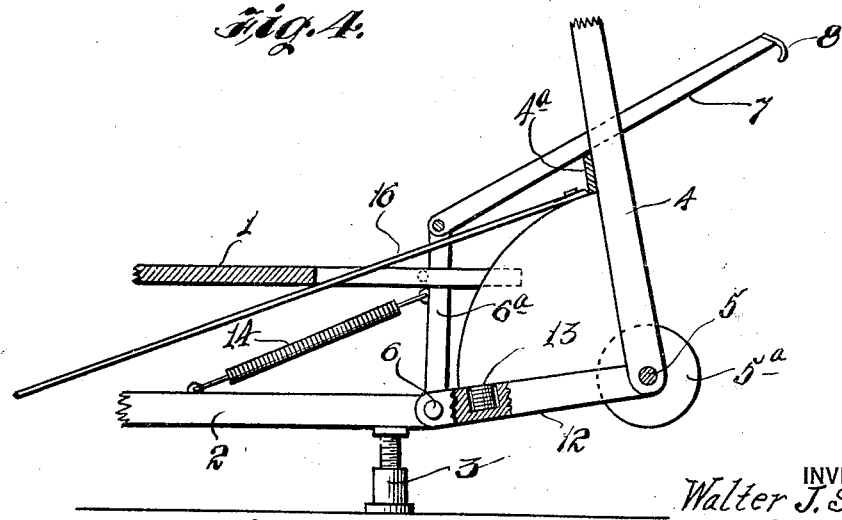

By reference to Figures 3, 4 and 5 it will be observed that there are arranged two segmental members 10 which are preferably fastened to the cross-piece 4ª or to the master fork members 4. Attached to each of these segmental members is a cable 11, the opposite end of which cable is connected to a drum on the baling machine and controlled by a clutch arrangement. This drum and clutch arrangement, however, is not shown since other means of connecting up and controlling the power from the baler may be employed to operate the attachment.

In addition to the link members 6ª there are provided links 12, connected to the rods 5 and 6. Each of these links 12 carries a spring 13 which is for the purpose of assisting the backward movement of the master fork members to gather a fresh supply of hay.

Connected to the links 6ª and to the beams 2 are springs 14. The purpose of these springs is to hold the hooks 8 snugly up against the cross-piece 4ª when the master fork members are in lowered position.

In the operation of the device, the hay or other material is moved upon the master fork members 4 and these fork members are then raised sufficiently, say in the position illustrated in Figure 3. When in the lowermost position the hooks have engaged the cross-piece 4ª, the links 6ª to which the springs are attached have been brought forward at the upper end and the spring is extended. When the master fork members are being raised these springs pull the links 6ª backward until they reach a substantially perpendicular position, as in Figure 4, where it is held against the stop pins 16 on the platform 1. When the position attained in Figure 5 is attained the springs 13 are depressed and thus assist the return of the fork members to the ground. The clutch enables the minor fork members and the master fork members to assume various positions and deposit the load of hay to the platform as needed and it can be forked and moved to the bailing chamber from any of the positions of the fork members.

Obviously minor alterations and changes may be made in the construction and arrangement of the apparatus such as will come within the meaning of the appended claims.

What is claimed is:

1. An attachment for hay balers comprising spaced arms constituting a master fork to receive the hay initally from the ground, a wheeled support for the fork; a plurality of minor arms constituting a movable platform, said master fork and movable platform providing means to move the hay in gradually higher positions from the ground to the baler chamber; a rod forming an axis for the wheeled support; link elements connecting the wheeled support and said shorter arms to extensible members from the baler; and means for assisting the return movement of the movable platform and fork.

2. An attachment for hay balers, comprising a plurality of spaced elongated members constituting a master fork for initially receiving the hay, fodder or the like from the ground; a plurality of shorter spaced elongated members constituting a minor fork, said shorter elongated members including means to retain them in proper relation to the master fork; means for connecting the attachment to the baler and means for moving the attachment to effect gradual lifting and depositing of the hay to the baler chamber.

In testimony whereof I affix my signature.

WALTER J. SPENCER.